Inventors
King L. Klopfenstein
Louis J. Mastella
by Olson, Mechlenburger, Von Holst, Pendleton & Neuman
Attys

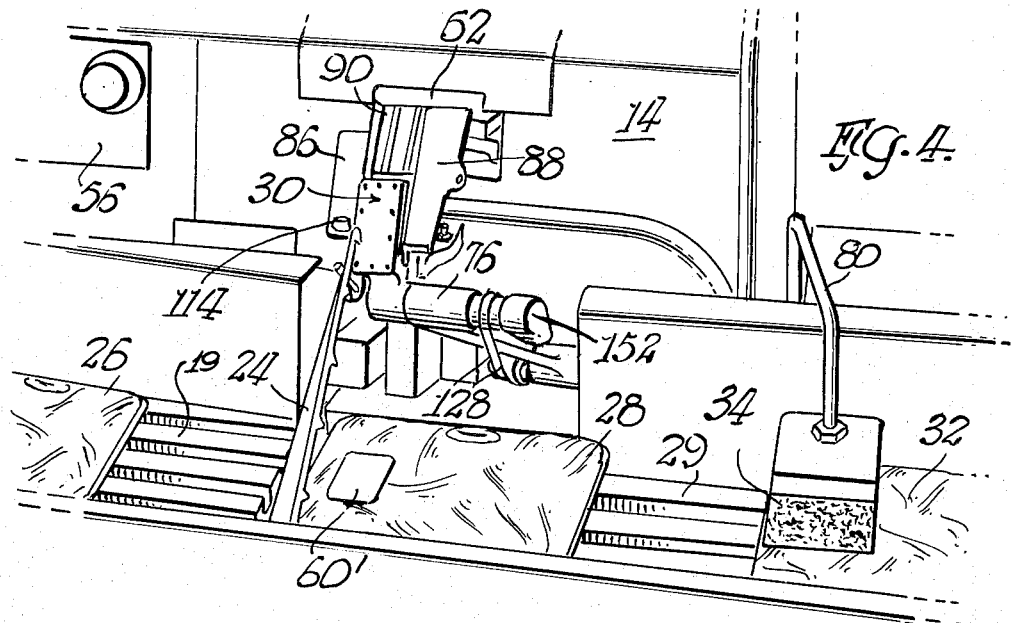
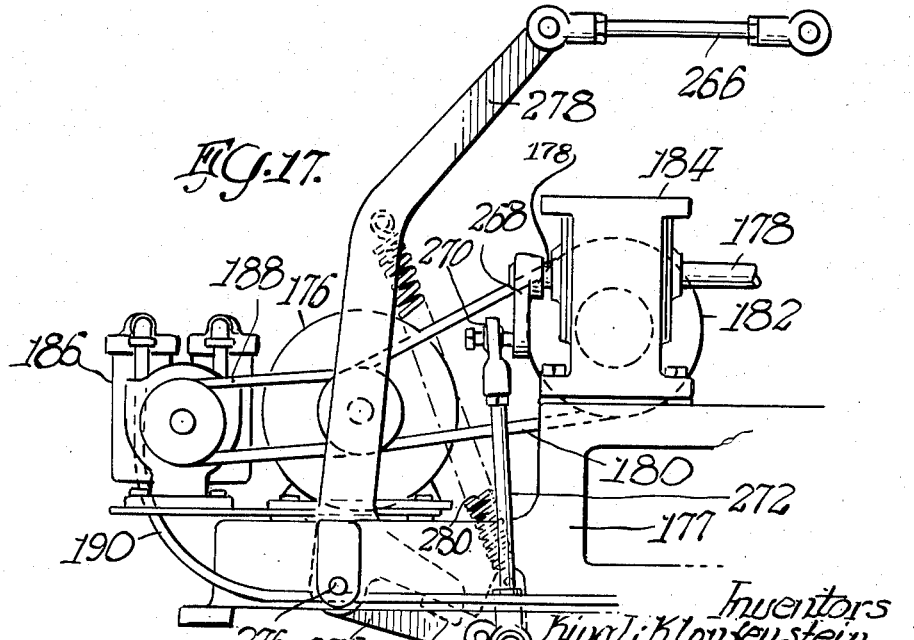

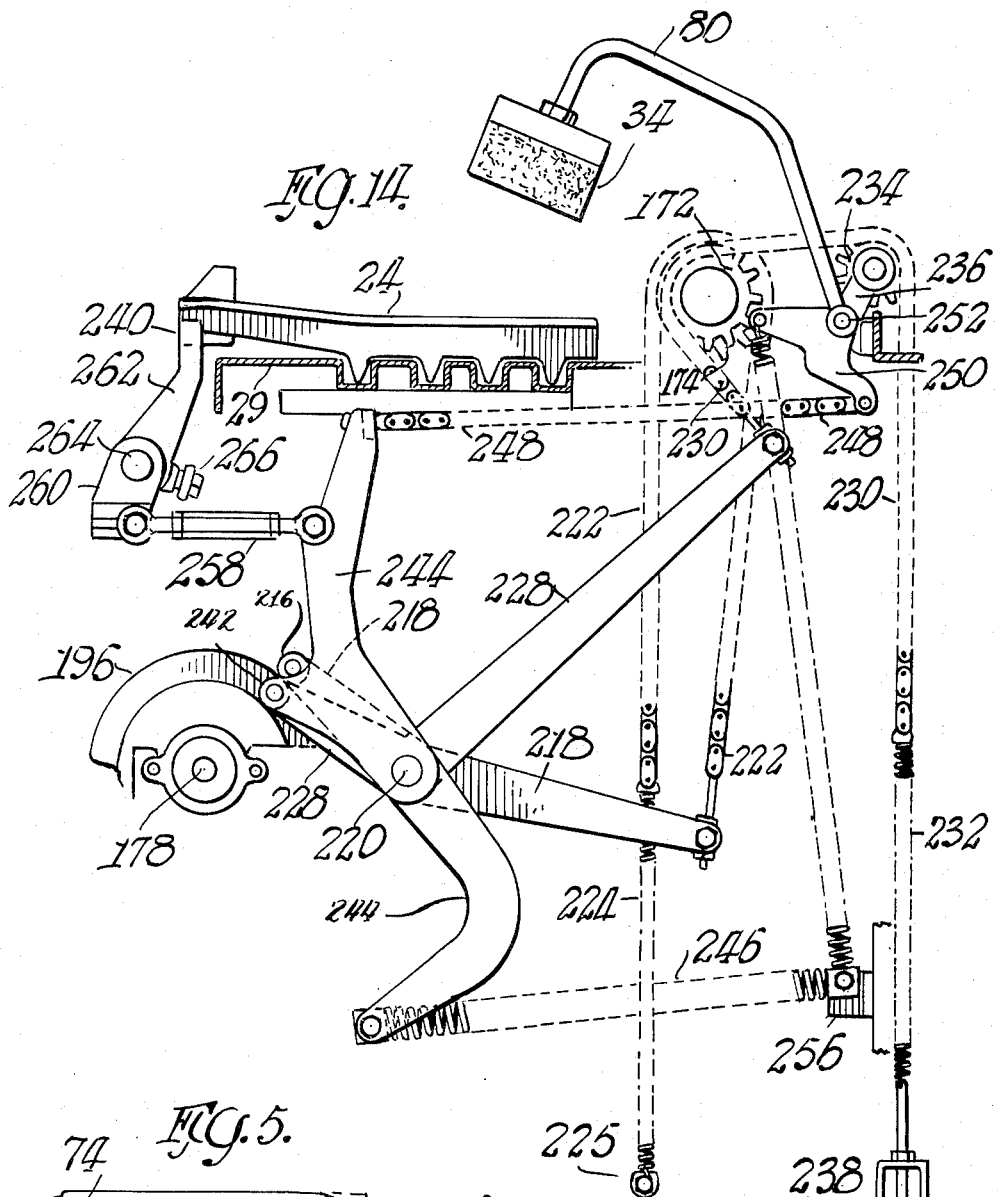

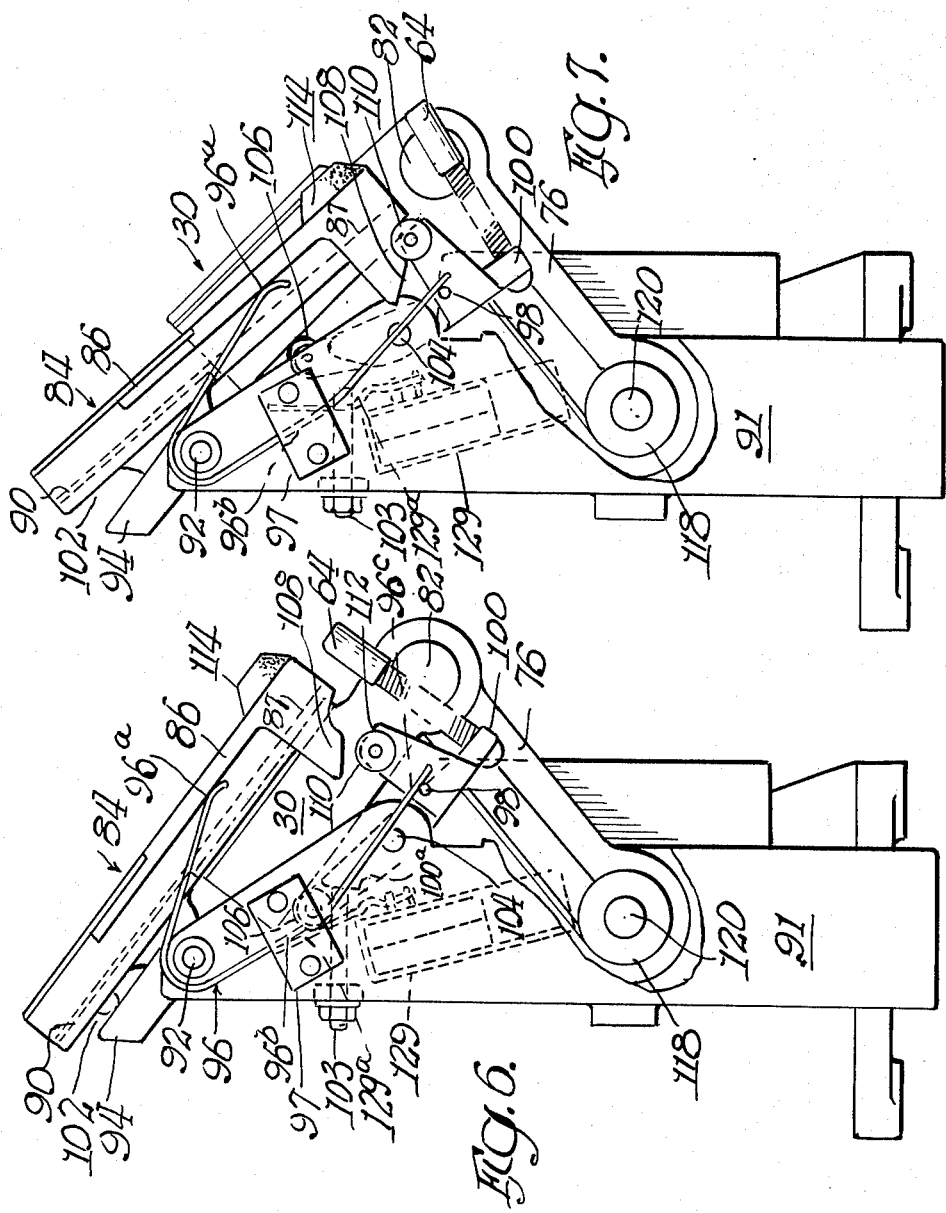

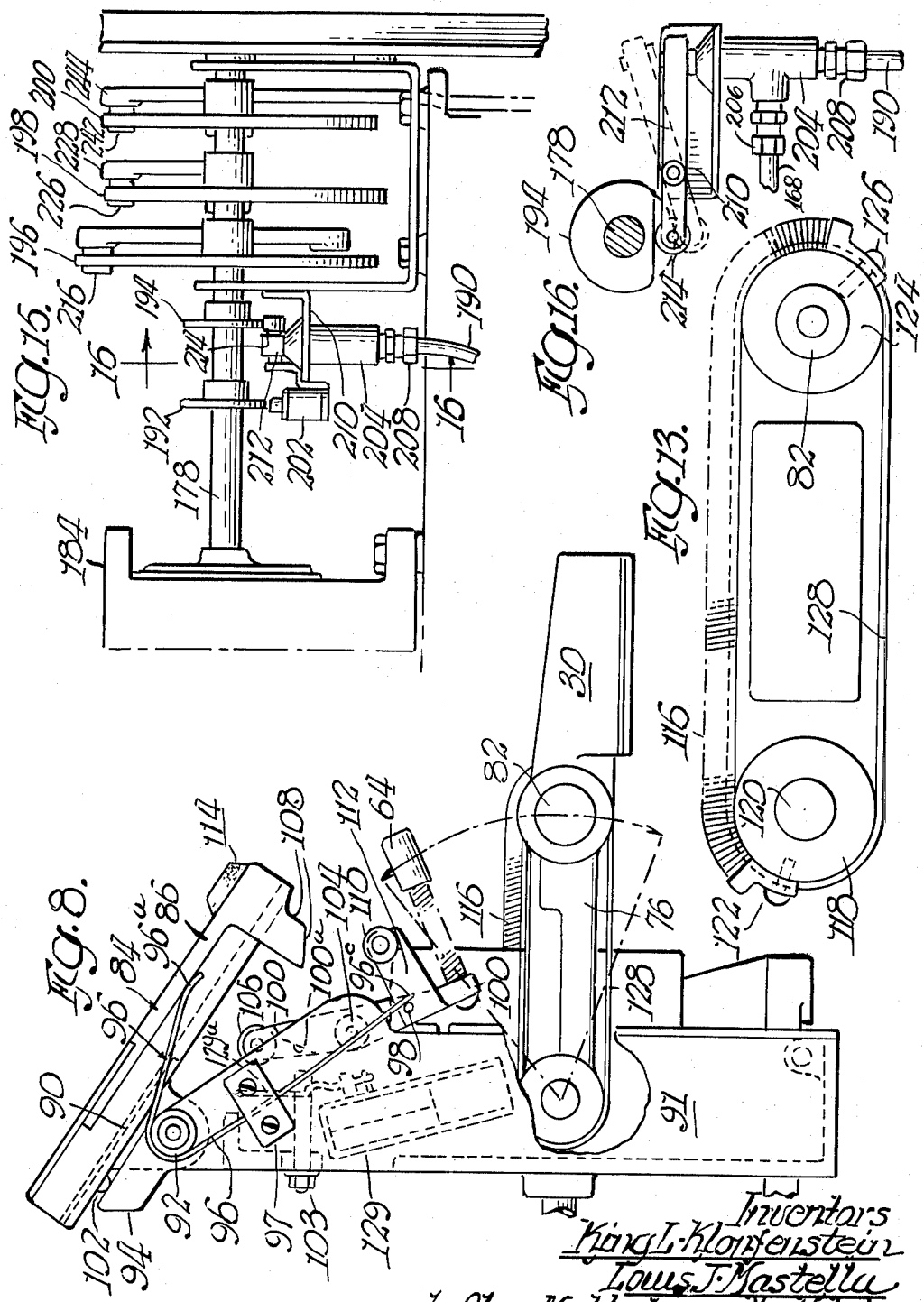

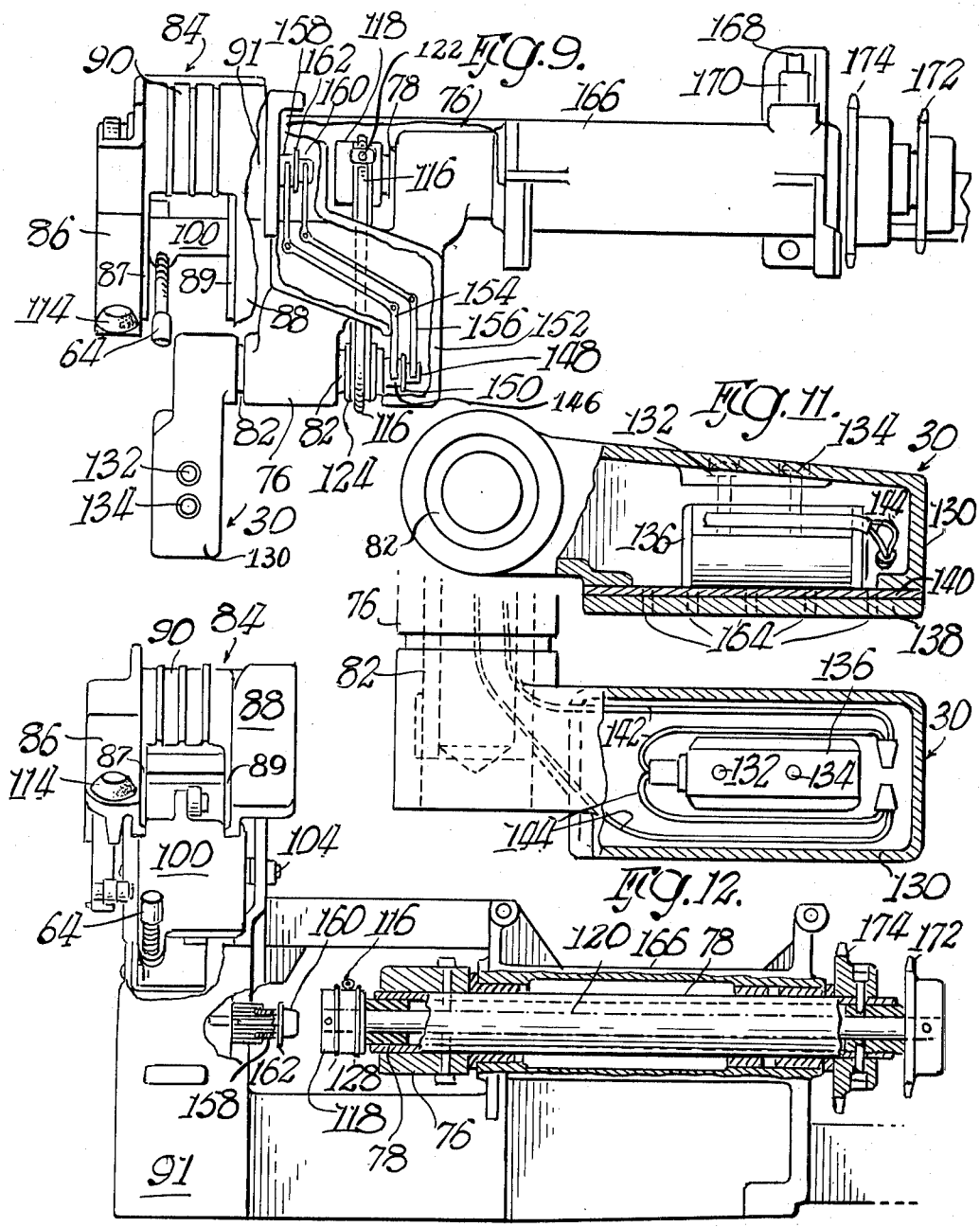

United States Patent Office 3,232,804
Patented Feb. 1, 1966

3,232,804
METHOD OF APPLYING LABEL
King L. Klopfenstein, Prospect Heights, and Louis J. Mastella, Berwyn, Ill., assignors to Triangle Package Machinery Company, Chicago, Ill., a corporation of Illinois
Filed Sept. 26, 1962, Ser. No. 226,373
2 Claims. (Cl. 156—60)

This invention relates to a method and means for applying labels to articles. More specifically, it relates to a reliable and automated method and means for receiving preprinted labels and adhesively applying them to solid articles, including packages of irregular thicknesses and configurations.

In keeping with the trend towards cost-cutting automation in all phases of business, considerable strides have been made in the field of automatic packaging and labeling of products, an area heretofore characterized by much hand labor. For example, in the field of prepackaged food products such as meat, fish, poultry, dairy and vegetable products and the like, methods and means have been developed for the automatic or semiautomatic wrapping of the product, the conveyance thereof, the weighing thereof, the computation of the cost, the preprinting of labels and the application of the label to the product. The present invention is specifically directed to an improvement in this latter step of automatic or semi-automatic label application.

While methods and means have been developed for automating the label-application step, such methods and means have heretofore suffered from various deficiencies, including erratic or unreliable operation, poor adhesion, undue complexity, lack of flexibility, insufficient speed, product damage, high cost and/or the like. It is therefore an object of the present invention to provide a method and means for applying labels to packages which are substantially free of or otherwise minimize such shortcomings.

It is a more specific object of the present invention to provide a reliable method and means for the inexpensive and rapid application of preprinted labels to articles of varied thicknesses and configurations. It is a still further object of the present invention to provide a simplified and practical method and means for the peel-resistant application of labels to irregularly-shaped articles, said method and means lending itself to both fully-automatic and semi-automatic operation. These and other objects of the present invention will become apparent as detailed description thereof proceeds.

The method

The method of applying a label in accordance with the present invention comprises providing an individual label with indicia on one face and an unactivated adhesive on the other face. The label is positioned with its indicia face engaged upon a movable support and with its adhesive face exposed. The indicia face is subjected to the influence of sub-atmospheric pressures through the supporting surface whereby the resulting vacuous condition holds the indicia face flat thereon so that it will not curl. While so held, the adhesive on the exposed face is activated by, for example, raising the temperature thereof. Simultaneously the movable support is moved towards the article to be labeled so that the adhesive face of the label contacts the article to produce an adherence thereto.

To assure transfer of the label, the vacuous condition between the label and support is released when the label is in contact with the article. To contour the label to the article after transfer, particularly in the case of an irregularly-shaped article, a resilient surface is imposed upon the indicia face.

In a particular embodiment, the plane of approach of the movable support to the article is uniform. By a "uniform" plane of approach is meant that, regardless of the thickness of the article, the support means for the label, upon contact with the article, remains parallel to a common plane, e.g., substantially horizontal.

The apparatus

To carry out the method, an apparatus is also provided which includes a first supporting means for the article to be labeled and, in spaced relation therefrom, a second supporting means for receiving labels individually from a source of labels. The second supporting means is movably disposed so as to be contactable with the article to be labeled on the first supporting means. The second supporting means also has a vacuum system for producing an interruptible vacuous condition between the label and the surface of the second supporting means whereby the label under the influence of the vacuous condition is held flat thereagainst while the adhesive is activated. In an advantageous embodiment, the adhesive of the label is heat-activatable so that the means for activating the adhesive may simply comprise a heating element within the second supporting means. Alternatively, hot air or another heat-affording medium may be employed. A drive means is also provided for moving the second supporting means so that the label supported thereon is brought in contact with the article on the first supporting means whereby the label is adhesively transferred to the article.

A movable, resilient pressure pad and a drive means therefor may also be provided, particularly when irregularly-shaped articles or packages are to be labeled. The pad is disposed so as to be contactable with the package and to apply pressure to the label previously transferred thereto. The resilient surface contours the label to the package or the wrapper thereon.

In an advantageous embodiment the support means for the label contacts the package in a uniform plane. In a more specific embodiment the supporting surface for the package is horizontal and the supporting surface for the label is substantially horizontally disposed when it contacts the package.

The drawings

The present invention and the advantages associated therewith will become more apparent from the following detailed description of a specific embodiment thereof, said description having reference to the accompanying drawings which form a part of this specification, wherein:

FIGURE 4 is a perspective view also similar to that of FIGURE 2 and shows that step in the method wherein a resilient surface is imposed upon a wrapped package to contour the label to the wrapper and a transport arm is raised in its return cycle preparatory to engagement with the package just labeled;

FIGURE 5 shows a typical example of the type of pre-printed label employed in the present method and apparatus;

FIGURE 6 is a side elevation view of the supporting means for the label, along with associated apparatus, said supporting means being shown in the "at rest" or label-receiving position;

FIGURE 7 is a side elevation view similar to that of FIGURE 6 except that the supporting means is shown in the semi-automatic label-applying position;

FIGURE 8 is a side elevation view similar to those of FIGURES 6 and 7 except that the supporting means has been rotated and swivelled down to the fully-automatic label-applying position;

FIGURE 9 is a partially-cutaway plan view of the apparatus of FIGURE 8;

FIGURE 10 is a partially-cutaway front elevation view of the apparatus of FIGURE 9;

FIGURE 11 is a partially-cutaway side elevation view of the label-supporting means in the down or label-applying position;

FIGURE 12 is a partially-cutaway plan view of the label-supporting means in the down or label-applying position;

FIGURE 13 is a side elevation view of the swivel arm for the label-supporting means;

FIGURE 14 is a side elevation view of the cams and actuating arms which drive the label-supporting means, the swivel arm therefor, the resilient contouring pad and the product conveyance arm (between the upper and lower position);

FIGURE 15 is a close-up elevation view of the cam shaft and cams of FIGURE 14 and the means for breaking the vacuum between the label and label-supporting means;

FIGURE 16 is a view taken along lines 16—16 of FIGURE 15 and shows a side elevation view of the vacuum-breaker means; and FIGURE 17 shows the drive motor for the apparatus with the associated belt-driven vacuum means and belt-driven gear reducer for the cam shaft and also the mechanical linkage for reciprocating the product conveyance arms.

General Description

Figure 1:
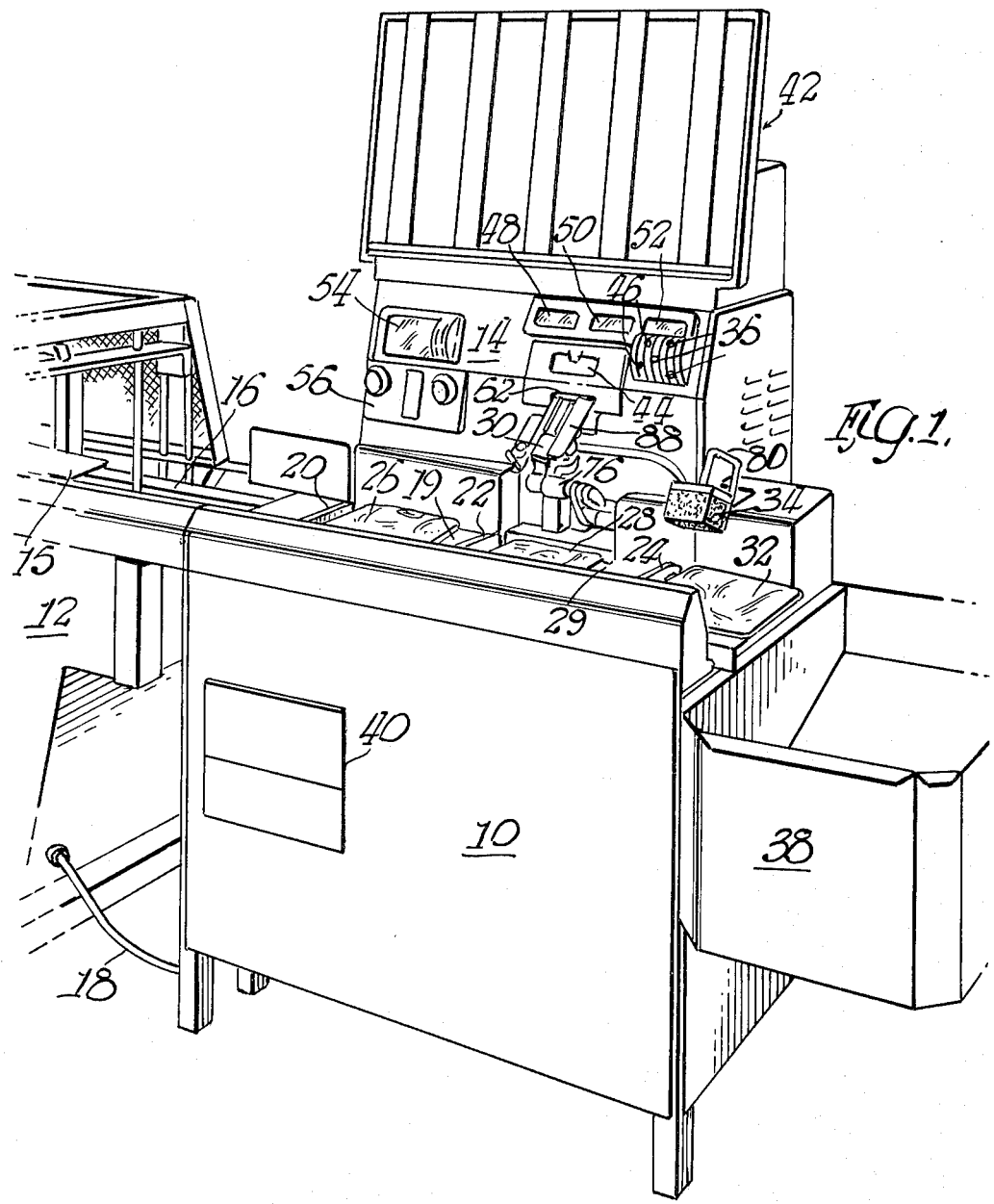
FIGURE 1 is a perspective view of the label applicator of the present invention in conjunction with associated apparatuses for package conveyance, weighing, price computing and label preprinting with which the present invention is advantageously employed.

Referring to FIGURE 1, a specific embodiment of the apparatus of the present invention is shown as label applicator 10, which is disposed so as to receive prepackaged articles such as meat from a wrapping and conveyance means, only a portion of the conveyance section being shown at 12. Reprinted labels with indicia on one face and adhesive on the other face are printed within scale-computer means 14 and are individually and gravitationally fed to label applicator 10.

Since wrapping and conveyance means 12, as well as the scale-computer means 14, do not of themselves constitute a part of the present invention, except in combination, and are known to those skilled in the art, they are not described herein in detail. In general, the wrapped article such as 15 exits from a wrapping zone (not shown) on the corrugated or channeled surface 16, the completion of a cycle of the wrapping means being electrically indicated to label applicator 10 via electrical connector 18. When such electrical indication is received, label applicator 10 commences its cycle, as will be described in greater detail hereinafter. This results in conveyance of the newly-wrapped package from surface 16 to the channeled weighing scale surface 19 of scale-computer 14 by transport arm 20, which, along with transport arms 22 and 24, reciprocates back and forth to push the packages in a series of steps in an approximately left-to-right direction in FIGURE 1. For the return stroke of each reciprocation, the arms are raised so as to pass freely over the packages and are then lowered so as to be in a position to engage the article for the next push stroke.

The channels on support surfaces 16 and 19 (also 29, identified hereinafter) provide passages for the downward-depending extensions or pins of transport arms 20, 22 and 24, as is apparent in FIGURE 14, to be considered hereinafter. This obviates any possibility of wedging very-thin packages between the transport arms and the supporting surfaces.

The cycle time for label applicator 10 is such that wrapped packages are processed thereon at a rate slightly faster than wrapping means 12 can prepare same. Hence, in practice, label applicator 10 is normally "waiting" for an electrical indication via cable 18 that wrapping means 12 has completed a cycle.

In FIGURE 1, the prepackaged articles are cellophane-wrapped steaks, one of which 26 is shown on the weighing scale surface 19 of scale-computer 14, a second of which 28 is shown in the label-applying position on channeled support surface 29 (substantially hidden in FIGURE 1) beneath movable label-supporting head 30 of label applicator 10 and a third of which 32 is shown beneath the movable resilient patter or pad 34 of label applicator 10. As may already be apparent, the pre-wrapped steaks are pushed from conveyance surface 16 by transport arm 20 onto the weighing scale surface of scale-computer 14, where its weight is automatically detected and provides one of the inputs to scale-computer 14. The other input to the scale-computer is the price per unit weight of the article being handled, that is, the steak. This input is manually preset in the computer by means of control handles 36 on scale-computer 14. From these two inputs scale-computer 14 computes the total price. This information, as well as the weight and unit price, and any other desired information, e.g., the name of the article, a date code, or the like, is then automatically imprinted on the indicia side of a paper label, the other side of the label having a heat-activatable adhesive applied thereto.

The package for which the label is imprinted is pushed by transport arm 22 to the label-applying position on surface 29 beneath label-supporting head 30. At the same time the label with the desired imprinted indicia is released from scale-computer 14 and slides gravitationally on to head 30 with the adhesive surface exposed. The indicia side is held flat on head 30 by a vacuous condition between the indicia side and the head. Head 30 is preferably electrically heated, whence the label held thereon is heated with resultant activation of the adhesive. Simultaneously, head 30 is swivelled and rotated so that the adhesive side of the label contacts the wrapper of the package, and the vacuous condition is then released, thereby effecting a transfer of the label from head 30 to the wrapper.

The package is then conveyed by transport arm 24 to the contouring position so that the transferred label is directly beneath movable pressure pad 34 having a resilient, sponge-like pad of several inches thickness for pressure application. When resilient pad 34 is rotated downward so that it contacts the label, it applies a substantially uniform pressure over the entire label regardless of the configuration or thickness of the package. This assures adherence of the label over its entire area. The package is then pushed into receiving chamber 38 by the next package to be contoured. While a receiving chamber 38 is shown in FIGURE 1, it should be understood that any other suitable receiving zone may be employed, e.g., conveyor belt, gravitational chute, or the like.

In FIGURE 1, panel 40 is the control panel for label applicator 10 and includes such controls as the off-on switch, the manual-automatic switch (its function to be described hereinafter), the rheostat for adjusting the temperature of label-supporting means 30, and the like. Upstanding rack 42 on scale-computer means 14 houses a full collection of type slugs bearing appropriate printed legends, e.g., "sirloin steak," which might be used on the labels which are printed in scale-computer means 14.

The selected one of such printings is conveniently inserted into scale-computer 14 at receptacle 44 and may be quickly changed, if desired.

Other indicia such as a date code may be printed on the label by adjusting control handles 46 on scale-computer 14. A visual indication of the various indicia, e.g., weight of article, price per pound, total cost or value, and data code, may be read on dial windows 48, 50 and 52. Panels 54 and 56 contain various scale and printer adjustments and visual displays for scale-computer 14, which are not directly pertinent to the present invention and need not be described in detail.

While not apparent in FIGURE 1, the three units of the particular system illustrated therein, i.e., label applicator 10 of the present invention, wrapping and conveyancing means 12 and scale-computer 14, are three separate units which are readily and quickly separable by disconnecting electrical leads therebetween, e.g., lead 18, and removing a few centering pins or bolts. Also not apparent in FIGURE 1 is the fact that corrugated weighing-scale surface 19 of scale-computer 14 registers with but is independent of corrugated support surface 29 of label applicator 10. Thus, weighing-scale surface 19 extends forward from scale-computer 14 and forms a bridge between surface 16 of conveyancing means 12 and surface 29 of label applicator 10.

Figure 2:
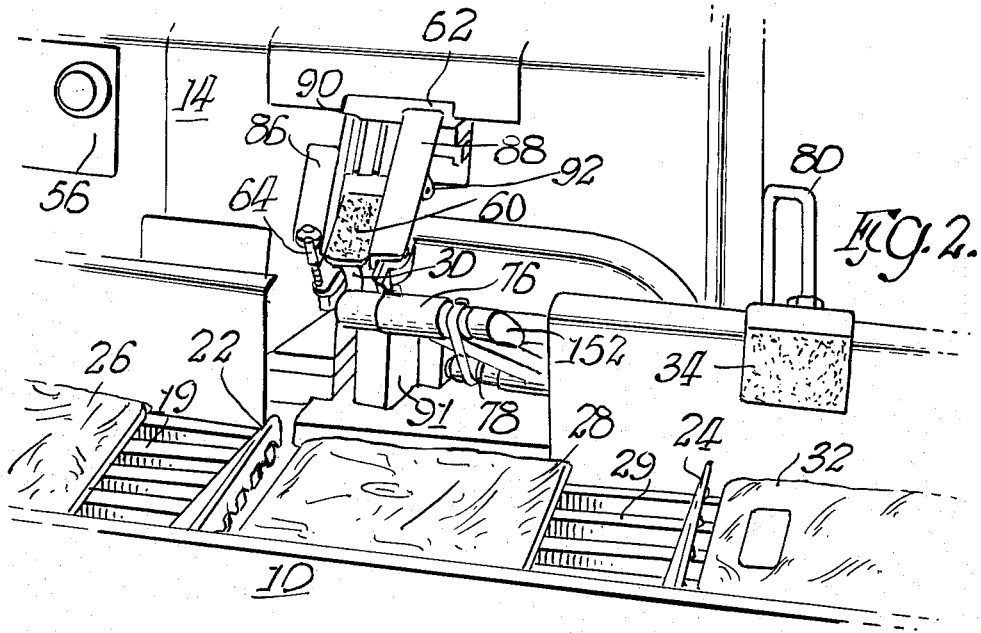
FIGURE 2 is a magnified perspective view of that portion of FIGURE 1 with which the present invention is primarily concerned and shows one of the initial steps in the method wherein a label is held flat on the label-supporting means under the influence of vacuum preparatory to activation of the adhesive and transport of the label towards the pre-wrapped package.
Figure 3:
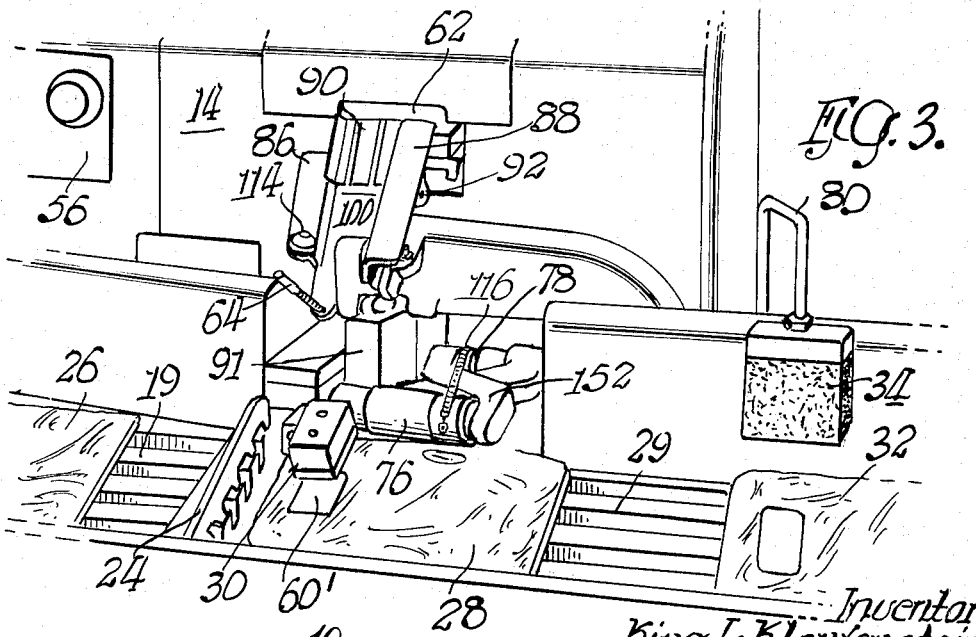
FIGURE 3 is a perspective view similar to that of FIGURE 2 and shows that step in the method wherein the label-supporting means after activation of the adhesive has been swivelled forward and down to apply the label to the waiting pre-wrapped package.

Referring to FIGURES 2, 3 and 4, which together show the sequence of operations of the label applicator 10, a preprinted label 60 is received from scale-computer 14 via gravity chute 62, and gravitationally falls until it hits spring-stop 64. As shown in FIGURE 4 and more-detailed drawings described hereinafter, the label-supporting head 30 has a series of apertures adjacent the periphery thereof whereby an interruptible vacuous condition is applied between the label and head so as to hold the label against head 30 to make it resistant to curling, particularly at the edges.

The application of sub-atmospheric pressures between the label and head is a critical requirement because in the embodiment illustrated the label has on its exposed surface a heat-activatable adhesive, usually one with delayed or "long" tack so as not to unduly set up before the contouring operation. As described in detail hereinafter, head 30 contains electrical heating elements, which raise the temperature of head 30 sufficiently so that the adhesive of the label supported thereon is activated. If the label were not held so as to resist curling, the thermal gradients set up in the label would tend to cause severe curling, loss of contact with the head and activation of only a portion of the adhesive.

A typical example of a label employed in the present embodiment is shown in FIGURE 5. One edge is deliberately curled upward to show the adhesive coating 66 on the back side thereof. On the indicia side the price per unit weight, the weight and total price are shown at 68, 70 and 72, respectively. A date code 74 is imprinted at the upper left-hand corner. The identity of the product, the name of the store or other appropriate legend may be imprinted at any of the vacant spaces on the label.

The size of the label is such that it completely covers the flat surface of label-supporting head 30. This has the advantage of preventing any direct contact between head 30 and the package being labeled. With the label itself thus acting as a heat insulator, the possibility of heat damage to the product is minimized.

After label 60 is received on head 30 with adhesive side exposed as shown in FIGURE 2, the head is rotated, with the label held thereon by the vacuous condition, to a downward position about pivot arm 76. Pivot arm 76 in turn is swivelled downward about labeling arm main shaft 78 (partially hidden) so that the adhesive side of the label contacts the package. At the same time the vacuous condition between the label and head 30 is released to effectuate a transfer of the label to the package, as shown in FIGURE 3.

The rotation of head 30 around pivot arm 76 and the swivelling of both about main shaft 78 are coordinated by means of actuating cams so that the surface of head 30 remains substantially horizontal as it approaches the package. Thus, regardless of the thickness or configurations of the package, the plane of approach of head 30 is constant.

After the label is thus transferred to the package, push-arm 24 is raised and reciprocates to the left, preparatory to being lowered for pushing the labeled package 28 to the right, as shown in FIGURE 4. At the same time, resilient pad 34 on arm 80 is lowered on package 32 so as to contour thereto the label previously transferred thereon, also shown in FIGURE 4.

While the operation carried out by resilient pad 34 is not necessarily critical when labeling substantially-flat articles such as steaks, it becomes most critical when irregularly-shaped articles are being labeled, such as whole chickens. In such case only spot or line contact between the adhesive side of the label and the package may occur as the result of lowering rigid head 30 thereon. Thus the label would not be adhered throughout the area of its adhesive side until resilient pad 34 is lowered and applied thereto.

Because of the possibility of only spot or line contact between the adhesive side of the label and the package, the importance of the vacuous condition during the prior adhesive-activation step becomes apparent. Without it, only a portion of the adhesive may be activated, particularly in the case of irregularly-shaped packages.

The operation described hereinabove represents the automatic operation of the apparatus of the present invention, wherein all steps are carried out fully automatically. A unique feature of the present apparatus, however, is its advantageous adaptability to semi-automatic operation wherein supporting head 30 may be manually actuated. For such semi-automatic operation, a control switch on panel 40 is placed in the manual position so that the electrical drive mechanism is inactivated. In this alternative type of operation, a label, already on supporting head 30, may be applied to a package by manually thrusting the package against head 30, which thrusting action exposes head 30 to assure proper contact between the label and package, as is apparent from the detailed description which follows.

Another aspect of the built-in flexibility of the apparatus is found in spring-stop 64. Should one want a supply of labels from scale-computer 14 without automatic or semi-automatic application thereof to packages, scale-computer 14 may accordingly be set for label dispensing and the labels received by pushing aside spring-stop 64.

*Detailed description*

Referring to FIGURES 6, 7 and 8, which show the label-supporting means, respectively, in the label-receiving position, semi-automatic label-applying position and fully-automatic label-applying position, and also referring to FIGURES 9 and 10 which are, respectively, partially-cutaway plan and front elevation views of the label-supporting means in the fully-automatic label-applying position, the label-supporting means 30 is secured to shaft 82 which is rotatably supported at one extremity of pivot arm 76. The other extremity of pivot arm 76 is secured to rotatable main shaft 78 (FIGURE 10).

In its "at rest" position, head 30, which is described in detail hereinafter in connection with FIGURES 11 and 12, is recessed within guide frame 84, which is made up of side guides 86 and 88 and intermediate chute extension 90, which registers with gravity chute 62 of scale-computer 14. In a preferred embodiment side guides 86 and 88 have tracks 87 and 89, respectively, protruding intermediately, for example, about 3/64" from the respective guides beyond chute extension 90 so as to support the edges of the label above head 30 as the label slides gravitationally. This minimizes frictional restraint or sticking of the label as it slides into position. Head 30 picks up the label and subjects it to a vacuous condition as it starts to rotate for label application.

Guide frame 84 is pivoted as a unitary structure on upstanding supporting frame 91 by means of pivot pin 92. It is biased in a counterclockwise direction (as shown in FIGURES 6–8) against stop 94 on supporting frame 91 by means of leaf spring 96, one extremity 96a of which bears against the underside of side guide 84, an intermediate portion 96b of which is held on frame 91 by bracket 97 and the other extremity 96c of which bears against pin 98 on rocker lever 100. The exact position of guide frame 84 with respect to stop 94 is adjustable by means of threaded pin 102.

Beneath head 30 in its "at rest" or label-receiving position is rocker lever 100 which is pivotally mounted within main frame 91 by means of pivot shaft 104. The extremity of rotation of rocker lever 100 in a counterclockwise direction in FIGURES 6–8 is adjustable by means of threaded stop 103 which is contactable with surface 100a of the rocker lever. Rocker lever 100 supports spring stop 64 at one extremity and roller 106 at the other extremity.

In the label-receiving position of head 30 of FIGURE 6, spring stop 64 functions as a positioning stop for the gravitationally-received label as it slides down chute 90 preparatory to being subjected, when operating fully automatically, to a vacuous condition so as to be held flat on head 30. In both the semi-automatic label-applying position and fully-automatic label-applying position of head 30, as shown in FIGURES 7 and 8, respectively, rocker lever 100 rotates clockwise sufficiently to move spring stop 64 downward. In the semi-automatic position as shown in FIGURE 7, this functions to bring the top of spring stop 64 below the level of head 30 so as not to interfere with a package manually placed against head 30 for purposes of label application. In the automatic position illustrated in FIGURE 8, it functions to provide clearance so that head 30 may be rotated and swivelled to the downward-facing horizontal position shown, without striking spring stop 64.

For the semi-automatic operation, the clockwise movement of rocker lever 100 in FIGURES 6–8 is brought about by pushing the article to be labeled against the lower portion of side guides 86 and 88 of guide frame 84. This action forces downward-depending cam surface 108 of side guide 84 against cam roller 110, which is mounted on upstanding extension 112 of rocker lever 100. The rocker lever is thus moved in a clockwise direction. This moves roller 106, which in the label-receiving position bears against the rear surface of head 30, so as to rotate head 30 slightly clockwise about pivot 82 so that the upper surface thereof, on which the label is supported, is raised above side guides 86 and 88, thereby exposing the label.

Hence, as a package is manually brought in contact with guide frame 84 in the position shown in FIGURE 6, it results in downward clockwise movement of guide frame 84 and simultaneous upward clockwise movement of head 30 so as to bring head 30 in contact with the package, as illustrated in FIGURE 7. To assure that the label-supporting surface of head 30 is raised above the side guides 86 and 88 of guide frame 84 when a package is brought in contact therewith, an upraised contact button 114 on side guide 86 is provided. Thus, adequate label-applying contact between the head and package is assured, even with irregularly-shaped packages.

For the fully-automatic operation, clockwise movement of rocker lever 100 in FIGURES 6–8 is brought about by means of the bias of leaf spring 96, extremity 96c of which bears against pin 98 on the rocker lever. In its label-receiving position, head 30 is held in the position of FIGURE 6 by coiled tension spring 116 (FIGURES 9, 10 and 13), one end of which is secured to hub 118 on head rotation main shaft 120 by threaded fastener 122, and the other end of which is wrapped around and secured to hub 124 on pivot shaft 82 by threaded fastener 126. The spring tension of spring 116 biases shaft 82 in a counterclockwise direction as shown in FIGURE 6 so that attached head 30 presses against roller 106 of rocker lever 100 with sufficient force to overcome the clockwise rotational tendency exerted by extremity 96c of leaf spring 96.

When the tension of spring 116 is overcome by rotating shaft 120 clockwise by means to be discussed hereinafter, dual connecting cables 128, the ends of which are secured to pulleys or hubs 118 and 124 by fasteners 122 and 126, respectively, transmits clockwise movement to shaft 82 and head 30. As soon as head 30 starts rotating, rocker lever 100, under the bias of leaf spring 96, follows, thereby dropping spring stop 64 below and out of the way, as shown in FIGURE 8. When head 30 returns from the label-applying to the label-receiving position, the action is reversed.

A comparison of FIGURES 7 and 8 with FIGURE 6 shows that rocker lever 100 has another function, that is, to supply a signal to scale-computer 14 when head 30 is moved to either the semi-automatic or fully-automatic label-applying positions. This is accomplished electrically by means of microswitch 129, the electrical circuitry of which is tied in by electrical leads (not shown) to that of scale-computer 14.

When head 30 is in the label-receiving position of FIGURE 6, microswitch actuating arm 129a is forced to the left against its own spring bias by roller 106 of rocker lever 100. When head 30 is in either the semi-automatic or fully-automatic label-applying positions of FIGURES 7 and 8, roller 106 moves clockwise to the right so that arm 129a snaps to its unloaded position as shown, thereby electrically signaling the movement of head 30. The receipt of the electrical signal in scale-computer 14 informs that unit that the previously-prepared label is now being applied to a package and that label applicator 10 will be momentarily ready to receive the next label. Thus, scale-computer 14 awaits the receipt of such signal before processing the next label. The need for such sequence signals is manifest.

Referring to FIGURES 11 and 12, head 30, which is illustrated in the downward label-applying position of FIGURE 8, comprises a hollow housing 130 having mounted thereon by means of screw fasteners 132 and 134 an electrical heating element 136 with exposed heating block 138 and intermediate gasket 140. Temperature of the heating head is adjustable by rheostat control of heating element 136, the particular temperature chosen depending on the requirements of the thermally-activatable adhesive selected. Many siutable adhesives are available and known to those skilled in the art; and in a typical instance a head temperature in the range of 300 to 400° F. has been found suitable for adhesive activation during fully-automatic operation.

Electric current for electrical heating element 136 is supplied via leads 142 and 144 which are connected via the hollow core of shaft 82 to a commutator assembly having inner and outer collector rings 146 and 148, respectively, with intermediate collector ring insulator 150 (FIGURE 9). The commutator assembly is enclosed within hollow housing 152 which is cast on top of pivot arm 76. One extremity of each of contact elements 154 and 156 ride on collector rings 146 and 148, respectively, and the other extremity of each ride on inner and outer collector rings 158 and 160 of a second and similar commutator assembly incorporated in frame 91, which assembly also includes a collector ring insulator 162. The second commutator assembly is electrically connected within frame 91 to an external source of electrical energy via conventional electrical leads (not shown). By means of the two commutator assemblies electrical energy is available to heating element 136 of head 30 regardless of its position or degree of rotation.

Heating block 138 and intermediate sealing gasket 140 have a series of peripheral apertures 164, by means of which a vacuous condition or sub-atmospheric pressures may be applied so as to hold a label flat against heating block 138. The vacuous condition is created by means of an interruptible vacuum system to be briefly described hereinafter in connection with FIGURES 15–17. The vacuum is applied to head 30 via the hollow connecting passages in shaft 82 and pivot arm 76; the connecting annular space between head rotation main shaft 120 and hollow concentric labeling arm main shaft 78, both of which are supported by substantially-gas-sealed bearings within shaft housing 166 (FIGURE 10); communicating passageways in housing 166; and vacuum line 168, which is connected to housing 166 by connector 170 (FIGURE 9).

The rotation of head rotation main shaft 120 and labeling arm main shaft 78 is achieved by means of sprockets 172 and 174, respectively, which are chain-driven via the motor, cam system and actuating arms shown in FIGURES 14–17. The primary source of mechanical energy is electric motor 176 (FIGURE 17), which is mounted on frame 177 and is operatively connected to main drive shaft 178 via belt 180, clutch pulley 182 of a magnetic clutch and speed reducer 184. Motor 176 is also operatively connected to vacuum pump 186 via belt drive 188, said pump having a vacuum line 190 which is connected to the vacuum interrupter system shown in FIGURE 16.

Main drive shaft 178 has a series of five control cams 192, 194, 196, 198 and 200 (FIGURE 15) adjustably-fixedly secured thereto. Cam 192 actuates off-on electric switch 202, which is part of a parallel electric-circuit controlling magnetic clutch 182, which circuit also includes electric connector 18 (FIGURE 1). At the beginning of a cycle, cam 192 is positioned so that switch 202 is in the off position so that magnetic clutch 182 is deenergized. Magnetic clutch 182 is initially energized so as to operatively couple electric motor 176, via belt 180 and speed reducer 184, to main drive 178 when an electric signal is transmitted to the clutch via electrical connector 18. The electric signal, actually the closing of an electric circuit, results, as aforementioned, when the wrapping zone completes a cycle. With magnetic clutch 182 thus energized, transport arm 20 is actuated, as described hereinafter, so as to engage any package on surface 16 and push it to weighing scale surface 19. The signal via electric connector 18 is of short duration; and, except for the parallel circuitry, including switch 202, magnetic clutch 182 would be deenergized before label applicator 10 completes its cycle.

Before the signal via connector 18 is interrupted, however, cam 192 has rotated sufficiently to actuate electric switch 202, which closes a parallel circuit and continues to energize the magnetic clutch until a cycle of label applicator 10 is completed. A cycle has reference to any one of the operations which occurs simultaneously at each of the three stations in the combined apparatus, i.e., the weighing station, the label-applying station and the label contouring station. At the completion of a cycle, cam-controlled switch 202 is opened and label applicator 10 remains at rest until another signal is transmitted to label applicator 10 via connector 18.

Cam 194 on main drive shaft 178 is shaped as shown in FIGURE 16 and serves to open and close the vacuum circuit which, when closed, holds the label flat on heating block 138 of head 30. As is already apparent from the previous description, the vacuous condition is applied after a label is gravitationally received via chute opening 62 from scale-computer 14 and slides down chute extension 90 until it strikes spring stop 64. In this position it covers heating block 138 and is then held flat thereon by application of the sub-atmospheric pressures.

This vacuous condition is maintained while head 30 is rotated and swivelled to the label-applying position of FIGURE 8 and is interrupted prior to the commencement of the return of head 30 to the label-receiving position of FIGURE 6. The vacuous condition assures proper activation of all of the heat-activatable adhesive on the exposed surface of the label, and at the same time the timely interruption of the vacuous condition assures that an adherence between the label and package is achieved.

The application and interruption of the vacuous condition is simply and readily achieved by means of T coupling 204 with connectors 206 and 208 which link vacuum lines 168 and 190. The third port of the T is secured to bracket 210 and is closed when vacuum breaker arm 212 is in the horizontal position so as to cover the port and is open when arm 212 is raised by engagement of the upraised surface of cam 194 with cam follower 214, as is indicated in dashed lines in FIGURE 16.

Cam 196 controls the rotation or swivelling of pivot arm 76 via cam follower 216; cam-follower arm 218, which is pivoted at pivot 220 (FIGURE 14); chain connector 222, which is tension loaded by coil spring 224; chain sprocket 174 and shaft 78. As is apparent from the geometry of the linkage, cam follower arm 218 rotates in the same direction as pivot arm 76. Likewise, since tension spring 224, which is anchored to the frame of the apparatus by holder 225, is the source of energy, pivot arm 76 will continue to rotate downward within the limits permitted by the configuration of cam 196 until the resistance thereto overcomes the tension of spring 224. Thus articles of various thicknesses can be accommodated and labeled without need for adjustment or risk of crushing same.

Cam 198 controls the rotation of head 30 via cam follower 226; cam follower arm 228, which is pivoted at pivot 220; chain connector 230, which is tension loaded by coil spring 232 via rotatable direction-changing sprocket 234 on fixed upstanding bracket 236; chain sprocket 172; shaft 120; hub 118; dual connecting cables 128; hub 124 and shaft 82. As is apparent from the geometry of the linkage, cam follower arm 228 rotates in a direction opposite to that of head 30. Tension spring 232 is anchored to the frame of the apparatus by bracket 238.

As previously indicated, the rotation of head 30 and pivot arm 76 is coordinated so that heating block 138 of head 30, regardless of the thickness of the article to be labeled, contacts the article in a common plane. This plane in the specific embodiment described is substantially horizontal as shown in FIGURE 8, as is the plane of surface 29 on which article to be labeled is supported. This desired coordination of the rotation of head 30 and pivot arm 76 is readily achieved, as one skilled in the art will recognize, by appropriate shaping of cams 196 and 198 and the placement thereof on main drive shaft 178.

Cam 200 controls the movement of pressure pad or patter 34 as well as the raising of transport arms 20, 22 and 24. Transport arms 20, 22 and 24 are mounted in fixed spaced relationship from each on a common horizontal support bar 240, one end of which can be seen in FIGURE 14.

The movement of pressure pad 34 is controlled by cam 200 via cam follower 242; cam follower arm 244, which is pivoted at pivot 220 and is biased in a counterclockwise direction in FIGURE 14 by tensioned coil spring 246; chain connector 248; double-arm casting 250; rotatable shaft 252, to which casting 250 is secured; and patter arm 80, which is secured to shaft 252. Casting 250 is biased in a counterclockwise direction in FIGURE 14 by tensioned coil spring 254, but the tension is not sufficient to overcome the greater tension of coil spring 246. Both coil springs 246 and 254 are secured to the frame of the apparatus at anchor bracket 256. From the geometry of the linkage it is apparent that patter arm 80 rotates in a direction opposite to that of cam follower arm 244.

The movement of transport arms 20, 22 and 24 is controlled by cam 200 by means of a linkage which includes cam follower arm 244, push rod 258, casting 260, bracket 262 and transport arm support bar 240. Casting 260 is secured to and pivots with a horizontal slide bar (not shown) rotatably mounted at 264. Bracket 262 is keyed by means of a roller confined within a track in the slide bar so as to rotate therewith but is slidably mounted thereon so as to be capable of horizontal movement along its length. This slidable movement along the length of the slide bar is controlled by push rod 266, only the end of which is visible in FIGURE 14 but which is shown lengthwise in FIGURE 17.

It is apparent from the geometry of the linkage in FIGURE 14 that the transport arms 20, 22 and 24 rotate in a direction opposite to that of cam follower arm 244. It is also apparent from FIGURE 14 that transport arms 20, 22 and 24 would rotate upward in a counterclockwise direction at the same time that patter arm 80 rotates downward, also in a counterclockwise direction.

The horizontal movement of push rod 266 is achieved by means of the linkage shown in FIGURE 17. Drive crank 268 is secured to and rotates with drive shaft 178 and, via universal joint 270, actuates push rod 272. The lower extremity of push rod 272 is pivotally secured by another universal joint to rocker arm 274, which in turn is rotatably mounted on frame 177 by means of shaft 276. Pusher arm 278 is also pivotally supported on shaft 276 and is "locked" to rocker arm 274 at common abutting surfaces 274a and 276a by means of tensioned interconnecting safety spring 280. Rocker arm and pusher arm 278 pivot as a unit about shaft 276 except when any one of the transport arms 20, 22 and 24 strikes an obstruction, preventing reciprocation of push rod 266 to the right in FIGURE 17. Safety spring 280 thus prevents breakage of the linkage or drive system when such obstructions are encountered.

From the geometry of the linkage just described, it is apparent that as drive shaft 178 rotates a full revolution, push rod 266 with attached assemblies, including transport arms 20, 22 and 24, will reciprocate back and forth horizontally. From the previous description of the action of cam follower arm 244, push rod 258, casting 260 and bracket 262, it is apparent that the horizontal movement of transport arms 20, 22 and 24 is accompanied by the periodic raising thereof. The two movements are co-ordinated so that the transport arms are down as they push the packages as shown in FIGURE 1 and are raised to pass back over the packages on the return stroke.

The proper coordination of all movements and linkages is readily achieved herein because all actuating movements are powered by the same common drive shaft 178. Hence, by proper design of cam shapes and proper placement of such actuating mechanisms on drive shaft 178, overall coordination is assured, as one skilled in the art will recognize in the light of the present disclosure.

*Other advantages*

From the above detailed description, it is apparent that the objects of the present invention have been achieved. Specifically, the present invention provides a reliable method and means for the inexpensive and rapid application of preprinted labels to articles of varied thicknesses and configurations. The method and means are relatively simple, lend themselves to both fully-automatic and semi-automatic operation and, in addition, result in a label which is substantially peel resistant.

As is also apparent from the above description, the method and means combine or "telescope" the operations of label receipt, label holding under vacuum, adhesive activation, label transport and label application into a simple, unitary, continuous operation. Because substantially all of the adhesive on the label is activated, the label, after contouring, is securely affixed to the package over the entire area of the adhesive. This is assured whether the article to be labeled is flat surfaced or irregularly-shaped.

Because label holding, adhesive activation and label transport are carried out simultaneously, terminating with label application, the operation is rapid, particularly when contrasted to prior-art techniques. Further, since there is no lag between the adhesive activation step and the label application step, there is no difficulty with premature adhesive setup. Moreover, when using heat-activatable adhesives, there is no need to overheat the adhesive to compensate for undesired cooling prior to label application.

Since the adhesive may be activated throughout the period that the label is being transported to the package, lower head temperatures are permitted for given amount of heat transfer. Moreover, there is no undesired contact between the heating head and the adhesive itself and no direct contact between the heating head and the package to be labeled, the label acting as an effective physical and thermal insulator. Furthermore, there are no mechanical fingers or other extraneous devices to effect label transport or to come between the label and heating surfaces.

When the apparatus is in semi-automatic operation, the vacuum system, which in the fully-automatic operation draws air through the orifices in the heating head and thus cools same, is disconnected from the heating head. Because air thus no longer passes through the head to carry away heat, the temperature of the head increases, even without increased heat input, e.g., from about 300–400° F. in fully-automatic operation to about 450–550° F. in semi-automatic operation. This increase is desirable because in semi-automatic operation the head travels a shorter distance and the operator usually labels packages with a faster motion than when they are labeled fully automatically. Thus the heating period is abbreviated. The higher head temperatures, however, compensate for this and are capable of activating the adhesive in the shorter period available without any adjustment.

The embodiment of the invention herein described is activated, as aforementioned, by the completion of a cycle of the associated wrapping means. This activation occurs whether an article was or was not actually wrapped. Hence, when a cycle is completed without depositing an article on the conveyance surface of the wrapping means, the label applicator also goes through its cycle. In effect, a "blank" operation occurs. The scale of the scale-computer, however, detects the absence of an article and does not process an unneeded label.

When the vacuum circuit is connected to the heated labeling head without a label supported thereon, the resulting passage of air therethrough contributes substantially to the aforementioned air cooling thereof. Under such circumstances, it is apparent why in fully-automatic operation head temperatures are typically in the range of 300–400° F., whereas in manual operation, wherein the vacuum circuit is never connected to the head, head temperatures rise substantially to 450–550° F. without additional heat input.

It should be understood, of course, that the present labeling apparatus can process any article regardless of whether it is wrapped. Thus the article need not be exiting from a wrapping zone or the like. Moreover, if "blank" cycles of the labeling apparatus are undesired, a conventional article detection or sensing circuit may be employed so that an activating signal is sent to the labeling apparatus only when an article is sensed.

While the method and means of the present invention have been described with particular reference to a specific label applicator design, such design is merely descriptive, and the inventive concept is not necessarily limited thereto. For example, the heating head might be made with a resilient surface so that the steps of label application and contouring may be combined. Many alternative modifications will be apparent from the above description to those skilled in the art. These and other alternatives are considered within the spirit and scope of the present invention and coverage thereof is intended by this application.

Having described the invention, what is claimed is:

1. The method of applying labels having a heat activatable adhesive thereon to packages of varying thicknesses which comprises the steps of moving a package to a labeling mechanism in a substantially horizontal plane, delivering a label from a source of supply to a label applicator which holds it thereon by vacuum until it is applied to the package, activating by heat the adhesive on the label while it is being held on the label applicator, moving the label applicator and the label thereon about a first pivot in a first arcuate path over the package which has been momentarily stopped in its movement, thereafter moving said label applicator in a second arcuate path in the same general direction, but with a significantly larger radius of arc, by rotation about a different pivot which is more remote from the package than the first pivot, continuing to move the applicator until it contacts the package, the length of this latter arc being yieldably regulated to the height of the package, transferring the label to the package by releasing the vacuum, and thereafter removing the package with the label thereon.

2. The method of applying labels to packages as defined in claim 1, including the further step of pressing a resilient surface to the transferred label, thereby to contour the labels to the package.

References Cited by the Examiner
UNITED STATES PATENTS

| | | | |
|---|---|---|---|
| 2,681,743 | 6/1954 | Phin et al. | 156—571 X |
| 2,683,548 | 7/1954 | Schiemel et al. | 156—571 X |
| 2,878,953 | 3/1959 | Mitchell | 156—571 X |
| 2,948,466 | 8/1960 | Allen et al. | 156—384 X |
| 2,983,398 | 5/1961 | Carter | 156—571 |

EARL M. BERGERT, *Primary Examiner.*